United States Patent [19]

Singh

[11] Patent Number: 5,062,550
[45] Date of Patent: Nov. 5, 1991

[54] SELECTIVE FLOW DISPENSING CONTAINER

[76] Inventor: Bharat H. Singh, 1314 41st St., Brooklyn, N.Y. 11218

[21] Appl. No.: 527,847

[22] Filed: May 24, 1990

[51] Int. Cl.$^5$ ............................................. B67D 5/00
[52] U.S. Cl. ................................... 222/80; 222/132; 222/192; 222/212; 222/481; 222/529; 222/565; 222/575; 239/289; 239/390; 239/561; 30/125
[58] Field of Search .................. 222/192, 80, 94, 129, 222/132, 212, 215, 331, 478, 479, 480, 481, 529, 543, 562, 565, 575; 30/125, 123.3; 239/289, 327, 390, 561

[56] References Cited

U.S. PATENT DOCUMENTS

| | | | |
|---|---|---|---|
| 2,656,600 | 10/1953 | Barbee | 30/125 X |
| 2,661,871 | 12/1953 | Huenergardt | 222/575 X |
| 2,944,705 | 7/1960 | Strumor | 222/94 |
| 2,968,262 | 1/1961 | Lacey | 222/575 X |
| 3,410,457 | 11/1968 | Brown | 30/125 X |
| 4,148,417 | 4/1979 | Simmons | 222/94 |
| 4,150,673 | 4/1979 | Watt | 222/80 X |
| 4,347,946 | 9/1982 | Nichols | 222/543 X |
| 4,699,299 | 10/1987 | Gach | 222/480 |
| 4,984,715 | 1/1991 | Green | 222/212 X |

FOREIGN PATENT DOCUMENTS

| | | | |
|---|---|---|---|
| 358629 | 9/1922 | Fed. Rep. of Germany | 30/123.3 |
| 2135981 | 9/1984 | United Kingdom | 222/480 |

Primary Examiner—Michael S. Huppert
Assistant Examiner—Gregory L. Huson
Attorney, Agent, or Firm—Leon Gilden

[57] ABSTRACT

An apparatus including a deformable memory retentent container, including a cap member, wherein the cap member includes a series of conduits mounted thereon in fluid communication with contents of the container. Each conduit is defined in a spaced relationship relative to an adjacent conduit, with each conduit including a respective first, second, and third opening of an increasing geometric configuration to accommodate selectively varying flow rates through each of the conduits to permit selective volumetric dispensing of contents within the container.

2 Claims, 4 Drawing Sheets

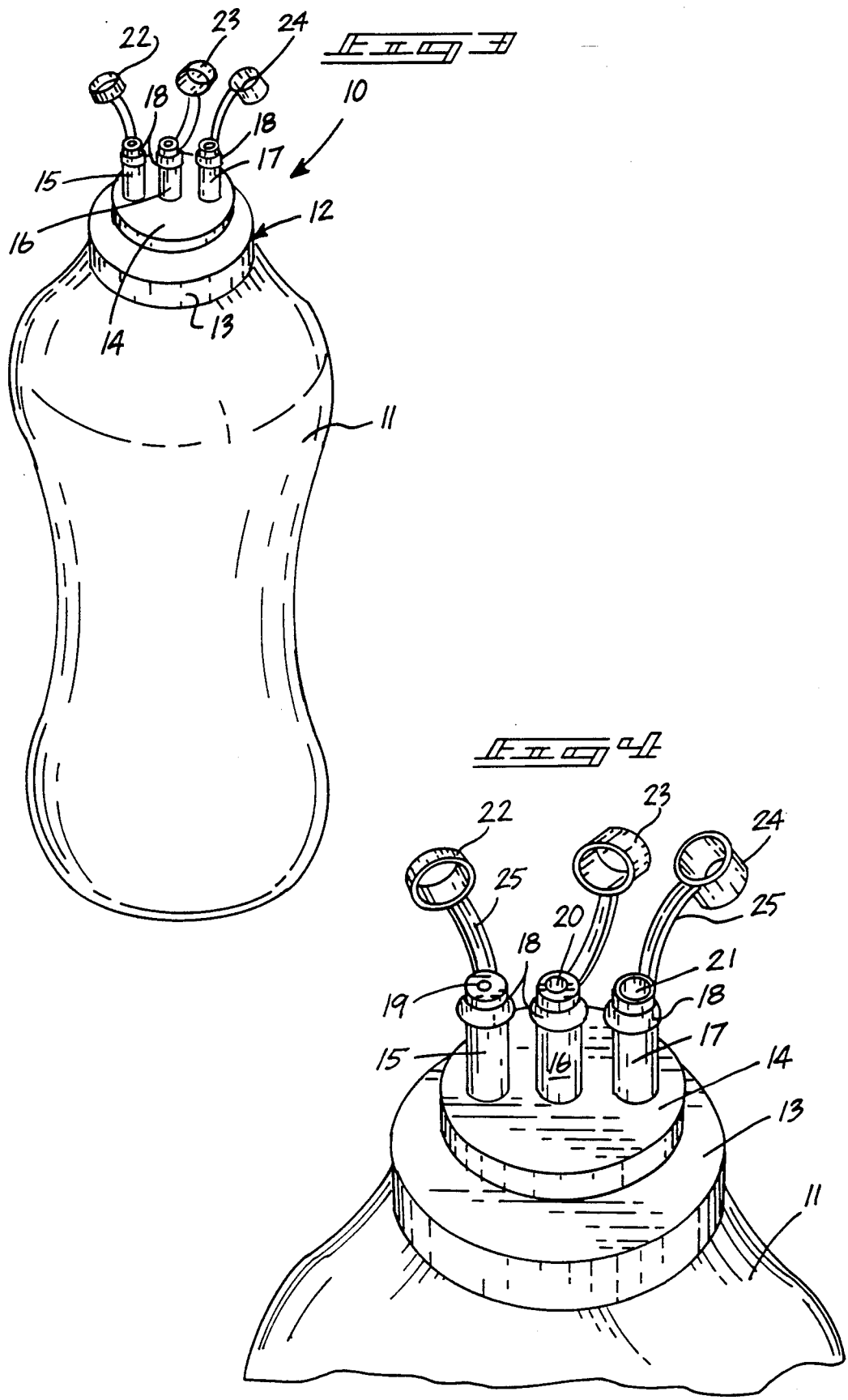

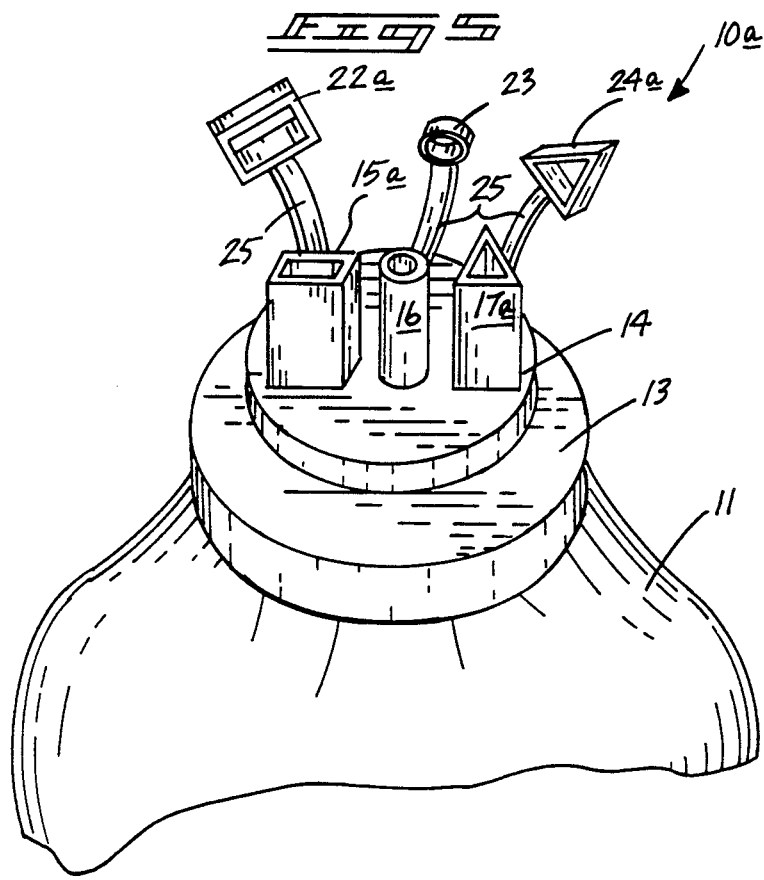
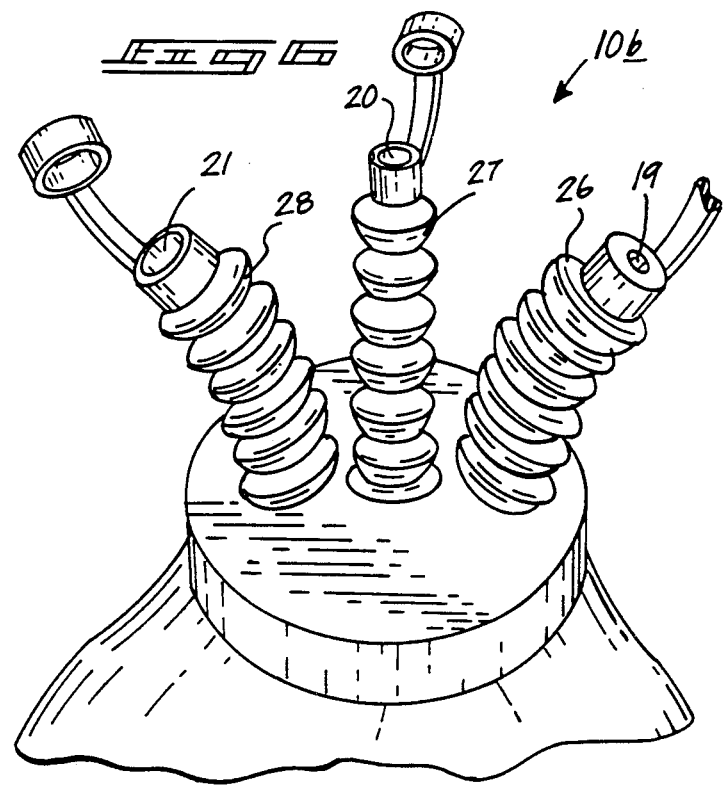

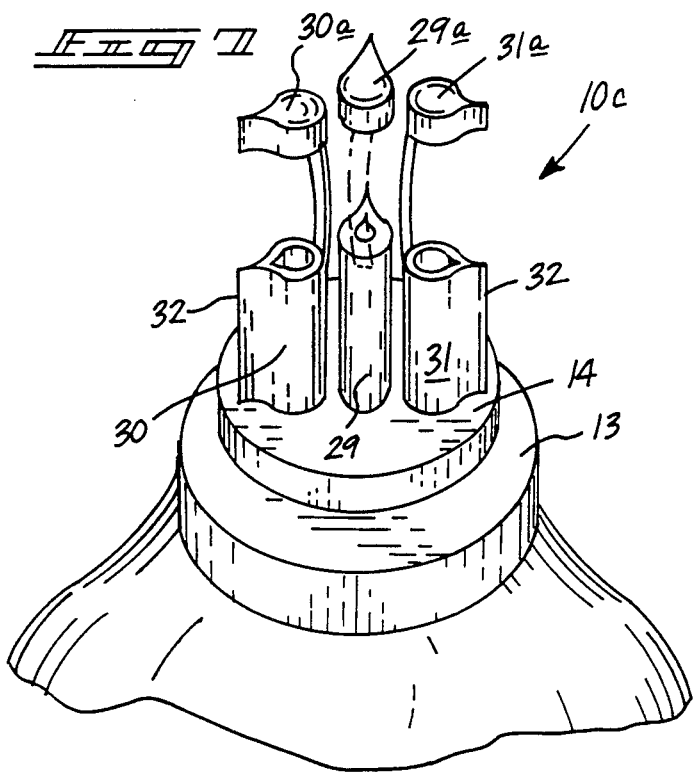
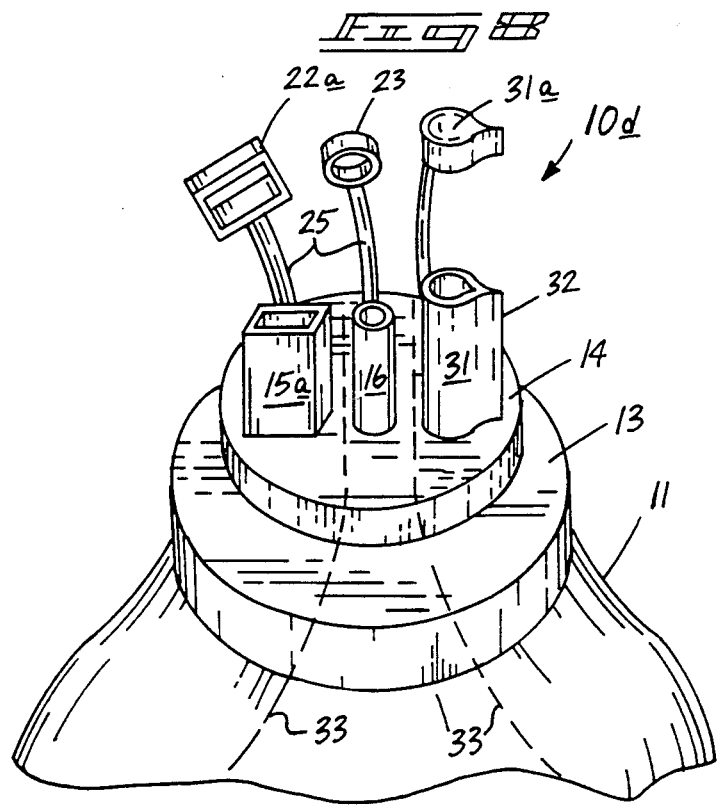

SELECTIVE FLOW DISPENSING CONTAINER

BACKGROUND OF THE INVENTION

1. Field of the Invention

The field of invention relates to dispensing containers, and more particularly pertains to a new and improved selective flow dispensing container wherein the same utilizes a selective conduit of a plurality of conduits to permit directing varying flow rates of contents from within the container.

2. Description of the Prior Art

Containers of various types and configurations have been developed in the prior art for dispensing of various commodities and components contained therewithin. Heretofore a single diameter dispensing conduit is typically associated with each container compartment, wherein in use, it is frequently desirable to dispense various flow rates through the container, such as in food components as ketchup, mustard, and the like. Examples of the prior art containers may be found in U.S. Pat. No. 3,729,553 to Gold wherein a multi-compartment container utilizes a single flow conduit associated with each compartment to permit a mixing of the components from the multi-compartments of the container.

U.S. Pat. No. 3,911,918 to Turner sets forth a multi-compartmented blood storage container utilizing a plurality of fluid conduits associated with each compartment, wherein the exit conduits are set forth of a unitary flow dispensing configuration.

U.S. Pat. No. 4,089,437 to Chutter provides for a single flow conduit utilizing a divider therewithin to direct flow from a plurality of chambers within the container.

U.S. Pat. No. 3,788,520 to Dukess sets forth a further example of a multi-compartmented dispensing container utilizing a divider within the exit conduit to direct flow from each of the compartments.

As such, it may be appreciated that there continues to be a need for a new and improved selective flow dispensing container wherein the same permits selective use of various discharge conduits of various configurations to dispense flow therefrom at a selective volumetric rate.

SUMMARY OF THE INVENTION

In view of the foregoing disadvantages inherent in the known types of dispensing containers now present in the prior art, the present invention provides a selective flow dispensing container wherein the same utilizes a plurality of selectively utilized dispensing conduits associated with a unitary chamber of a container to dispense flow in a selective volumetric rate therefrom. As such, the general purpose of the present invention, which will be described subsequently in greater detail, is to provide a new and improved selective flow dispensing container which has all the advantages of the prior art dispensing containers and none of the disadvantages.

To attain this, the present invention provides an apparatus including a deformable memory retentent container, including a cap member, wherein the cap member includes a series of conduits mounted thereon in fluid communication with contents of the container. Each conduit is defined in a spaced relationship relative to an adjacent conduit, with each conduit including a respective first, second, and third opening of an increasing geometric configuration to accommodate selectively varying flow rates through each of the conduits to permit selective volumetric dispensing of contents within the container.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved selective flow dispensing container which has all the advantages of the prior art dispensing containers and none of the disadvantages.

It is another object of the present invention to provide a new and improved selective flow dispensing container which may be easily and efficiently manufactured and marketed.

It is a further object of the present invention to provide a new and improved selective flow dispensing container which is of a durable and reliable construction.

An even further object of the present invention is to provide a new and improved selective flow dispensing container which is susceptible of a low cost of manufacture with regard to both materials and labor, and which accordingly is then susceptible of low prices of sale to the consuming public, thereby making such selective flow dispensing container economically available to the buying public.

Still yet another object of the present invention is to provide a new and improved selective flow dispensing container which provides in the apparatuses and methods of the prior art some of the advantages thereof, while simultaneously overcoming some of the disadvantages normally associated therewith.

Still another object of the present invention is to provide a new and improved selective flow dispensing container wherein the same utilizes variously configured dispensing conduits to direct flow from interiorly of a container and permit individuals to select volumetric flow rates from the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an isometric illustration of the dispensing cap utilized by the instant invention, somewhat enlarged.

FIG. 5 is an isometric illustration of a modified dispensing container utilized by the instant invention.

FIG. 6 is an isometric illustration of a further modified dispensing container utilized by the instant invention.

FIG. 7 is an isometric illustration of a yet further modified dispensing container utilized by the instant invention.

FIG. 8 is a dispensing head for use with a compartmentalized container utilizing variously configured conduits.

DESCRIPTION OF THE PREFERRED EMBODIMENT

Figure 1:
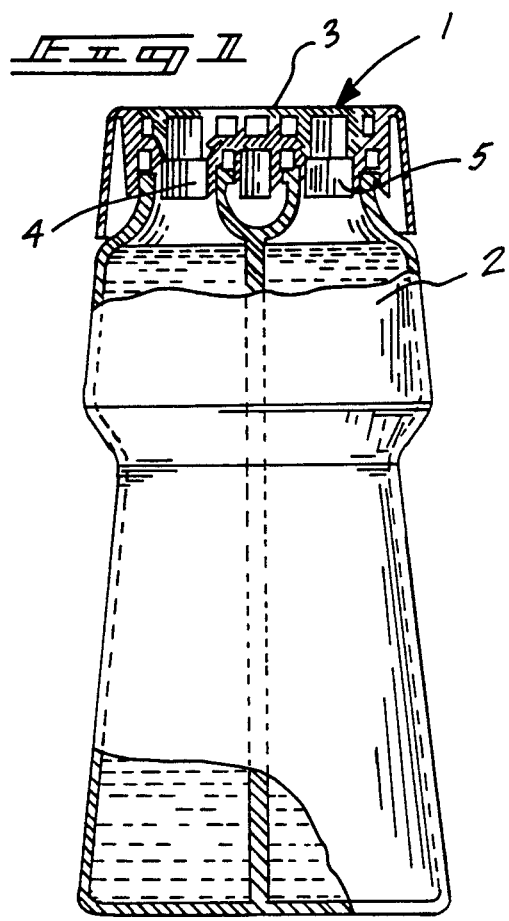
FIG. 1 is an orthographic view, taken in elevation, partially in section, of a prior art dispensing container.
Figure 2:
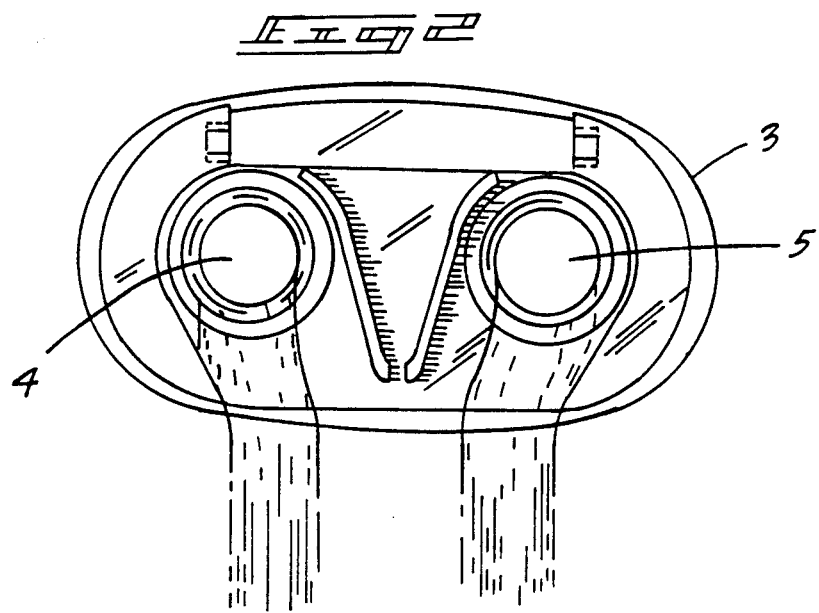
FIG. 2 is an orthographic top view of the dispensing container as set forth in FIG. 1.

With reference now to the drawings, and in particular to FIGS. 1 to 8 thereof, a new and improved selective flow dispensing container embodying the principles and concepts of the present invention and generally designated by the reference numerals 10, 10a, 10b, 10c, and 10d will be described.

FIG. 1 illustrates a prior art dispensing container 1, wherein the container 2 utilizes a compartmentalized divider wall to associate various fluid components, with a first and second respective dispensing conduit 4 and 5 associated with each discrete chamber, with a lid 3 overlying the conduits.

More specifically, the selective flow dispensing container 10 essentially comprises an elongate coaxially aligned polymeric deformable container 11 formed of a memory retentent material. The container 11 includes a cap member 12 mounted thereon in a conventional manner either in a threaded or snap-fit relationship. The cap member 12 includes a cap base 13 formed with a rigid cap cover 14, wherein the cap cover 14 includes a respective first, second, and third conduit 15, 16, and 17 orthogonally mounted to the cap cover and arranged generally parallel to an axis defined by the container 11, wherein the conduits are equally spaced along the diameter of the cap cover 14 and directed therethrough in fluid communication with contents contained within the container 11, wherein the container 11 is formed of a unitary compartment containing a flowable material therewithin. Each conduit further includes a resilient annular lip 18 formed adjacent each upper terminal end of each conduit to enhance frictional engagement interiorly of a respective first, second, and third closure cap 22, 23, and 24 associated with each respective first, second, and third conduit. Each closure cap is secured to each conduit by use of a flexible band 25. Further, each of the first, second, and third conduits include a respective first, second, and third opening 19, 20, and 21 each formed of a respective first, second, and third diameter, wherein the third diameter is greater than that of the second diameter, and wherein the second diameter is greater than that of the first diameter to permit selective volumetric dispensing of a fluidlike component contained within the container 11, as desired by an individual.

FIG. 5 illustrates the use of a modified first conduit 15a associated with a modified third conduit 17a utilizing the second conduit 16, wherein each conduit includes an associated cap defined by a modified first conduit cap 22a, and a modified third conduit closure cap 24a of a complementary geometric configuration to that of the respective conduit. The variously configured conduits permit directing of a viscous fluid in a predetermined pattern from within the container, if required.

FIG. 6 illustrates the use of accordion pleated conduits defined by a first, second, and third accordion pleated conduit 26, 27, and 28 to permit repositioning of the respective first, second, and third discharge opening 19, 20, and 21.

FIG. 7 illustrates the use of a first, second, and third conduit 29, 30, and 31, each of an ever increasing diametrical opening, wherein each conduit includes a knife edge 32 arranged parallel to each other and to the axis of the container 11, wherein the knife edge 32 is radially aligned with the cap cover 14 perimeter edge to permit severing of various food components prior to directing of fluid of each of the conduits, such as within a conventional hot dog, permitting splitting of the hot dog prior to insertion of a food component, such as ketchup or mustard within the hot dog for consumption.

FIG. 8 illustrates the use of the instant invention in association with partition walls 33 contained within the conduit, wherein the variously configured conduits are associated with an individual reservoir, if required.

As to the manner of usage and operation of the instant invention, the same should be apparent from the above disclosure, and accordingly, no further discussion relative to the manner of usage and operation of the instant inventions shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters patent of the United States is as follows:

1. A selective flow dispensing container comprising, in combination,
    a polymeric deformable container defined about a central axis, including a cap member mounted to an upper end of the container, the cap member including a rigid cap cover overlying the cap member enclosing the container, the cap cover including a first, second, and third fluid conduit integrally mounted to the cap cover, wherein each conduit is in fluid communication with contents contained within the container, and
    wherein the first conduit includes a first opening at an upper terminal end thereof, the second conduit includes a second opening at an upper terminal end of the second conduit, and wherein the third conduit includes a third opening at an upper terminal end of the third conduit, the first opening is defined by a first diameter, the second opening is defined by a second diameter, and the third opening is defined by a third diameter, and
    wherein the third diameter is greater than the second diameter, and wherein the second diameter is greater than that defined by the first diameter, and
    the first, second, and third conduits are arranged parallel relative to one another and are arranged parallel to the axis defined by the container, and
    the first conduit includes a first closure cap, the second conduit includes a second closure cap, and the third conduit includes a third closure cap, wherein each closure cap is individually secured to each respective conduit, and
    each first, second, and third closure cap is secured to each respective first, second, and third conduit by a respective flexible band, and
    wherein the first conduit, the second conduit, and the third conduit each include a knife edge integrally formed to each conduit.

2. An apparatus as set forth in claim 1 wherein each knife edge is axially aligned relative to each conduit, and each knife edge is radially aligned with a perimeter defined by the cap cover, wherein each knife edge is positioned adjacent the perimeter of the cap cover.

* * * * *